United States Patent
Ke et al.

(10) Patent No.: US 11,442,866 B2
(45) Date of Patent: Sep. 13, 2022

(54) COMPUTER MEMORY MODULE PROCESSING DEVICE WITH CACHE STORAGE

(71) Applicant: Meta Platforms, Inc., Menlo Park, CA (US)

(72) Inventors: Liu Ke, Cambridge, MA (US); Xuan Zhang, St. Louis, MO (US); Udit Gupta, Cambridge, MA (US); Carole-Jean Wu, Newton, MA (US); Mark David Hempstead, Melrose, MA (US); Brandon Reagen, Boston, MA (US); Hsien-Hsin Sean Lee, Cambridge, MA (US)

(73) Assignee: Meta Platforms, Inc., Menlo Park, CA (US)

( * ) Notice: Subject to any disclaimer, the term of this patent is extended or adjusted under 35 U.S.C. 154(b) by 63 days.

(21) Appl. No.: 16/783,924

(22) Filed: Feb. 6, 2020

(65) Prior Publication Data
US 2021/0191871 A1    Jun. 24, 2021

Related U.S. Application Data

(60) Provisional application No. 62/951,403, filed on Dec. 20, 2019.

(51) Int. Cl.
*G06F 12/08* (2016.01)
*G06F 12/0875* (2016.01)
*G06N 20/00* (2019.01)

(52) U.S. Cl.
CPC .... *G06F 12/0875* (2013.01); *G06F 2212/608* (2013.01); *G06N 20/00* (2019.01)

(58) Field of Classification Search
CPC .................................................. G06F 12/0875
See application file for complete search history.

(56) References Cited

U.S. PATENT DOCUMENTS

2004/0250006 A1* 12/2004 Lin ...................... H03L 7/0812
                                                                        711/3
2008/0059708 A1*  3/2008 Lawson ................ G06F 3/0659
                                                                      711/112

(Continued)

OTHER PUBLICATIONS

A. Parashar, M. Rhu, A. Mukkara, A. Puglielli, R. Venkatesan, B. Khailany, J. Emer, S. W. Keckler, and W. J. Dally, "SCNN: An accelerator for compressed-sparse convolutional neural networks," in Proc. of the Intl. Symp. on Computer Architecture, 2017.

(Continued)

*Primary Examiner* — Jae U Yu
(74) *Attorney, Agent, or Firm* — Van Pelt, Yi & James LLP (57) ABSTRACT

A device (e.g., an application-specific integrated circuit chip) includes a memory module processing unit and an interface. The memory module processing unit is configured to receive an instruction to obtain values stored in one or more memory components and process the obtained values to return a processed result. The memory module processing unit is also configured to store the obtained values in a cache based on one or more criteria. The memory module processing unit is configured to be included on a computer memory module configured to be installed in a computer system. The interface is configured to communicate with the one or more memory components included on the computer memory module.

20 Claims, 8 Drawing Sheets

(56) References Cited

U.S. PATENT DOCUMENTS

| | | | |
|---|---|---|---|
| 2009/0037676 A1* | 2/2009 | Coronado | G06F 11/2069 |
| | | | 711/162 |
| 2013/0232293 A1* | 9/2013 | Nguyen | G06F 3/0673 |
| | | | 711/103 |

OTHER PUBLICATIONS

A. Shafiee, A. Nag, N. Muralimanohar, R. Balasubramonian, J. P. Strachan, M. Hu, R. S. Williams, and V. Srikumar, "ISAAC: a convolutional neural network accelerator with in-situ analog arithmetic in crossbars," in Proc. of the Intl. Symp. on Computer Architecture, 2016, pp. 14-26.

A. Yazdanbakhsh, K. Samadi, H. Esmaeilzadeh, and N. S. Kim, "GANAX: a unified SIMD-MIMD acceleration for generative adversarial network," in Proc. of the Intl. Symp. on Computer Architecture, 2018.

B. Reagen, P. Whatmough, R. Adolf, S. Rama, H. Lee, S. K. Lee, J. M. Hern'andez-Lobato, G.-Y. Wei, and D. Brooks, "Minerva: Enabling low-power, highly-accurate deep neural network accelerators," in Proceedings of the ACM/IEEE 43rd Annual International Symposium on Computer Architecture (ISCA). IEEE, 2016, pp. 267-278.

E. Park, D. Kim, and S. Yoo, "Energy-efficient neural network accelerator based on outlier-aware low-precision computation," Proc. of the Intl. Symp. on Computer Architecture, 2018.

G. Zhou, X. Zhu, C. Song, Y. Fan, H. Zhu, X. Ma, Y. Yan, J. Jin, H. Li, and K. Gai, "Deep interest network for click-through rate prediction," in Proceedings of the 24th ACM SIGKDD International Conference on Knowledge Discovery & Data Mining, KDD 2018, London, UK, Aug. 19-23, 2018, 2018, pp. 1059-1068.

H. Sharma, J. Park, N. Suda, L. Lai, B. Chau, V. Chandra, and H. Esmaeilzadeh, "Bit fusion: Bit-level dynamically composable architecture for accelerating deep neural network," Proc. of the Intl. Symp. on Computer Architecture, 2018.

J. Ngiam, Z. Chen, D. Chia, P. W. Koh, Q. V. Le, and A. Y. Ng, "Tiled convolutional neural networks," NIPS, pp. 1279-1287, 2010.

J. Yu, A. Lukefahr, D. J. Palframan, G. S. Dasika, R. Das, and S. A. Mahlke, "Scalpel: Customizing DNN pruning to the underlying hardware parallelism," in Proc. of the Intl. Symp. on Computer Architecture, 2017.

M. Naumov, D. Mudigere, H.-J. M. Shi, J. Huang, N. Sundaraman, J. Park, X. Wang, U. Gupta, C.-J. Wu, A. G. Azzolini, D. Dzhulgakov, A. Mallevich, L Cherniavskii, Y. Lu, R. Krishnamoorthi, A. Yu, V. Kondratenko, X. Chen, V. Rao, B. Jia, L. Xiong, and M. Smelyanskiy, "Deep learning recommendation model for personalization and recommendation systems," arXiv preprint arXiv:1906.00091, 2019. [Online], Available: https://arxiv.org/abs/1906.00091.

M. Rhu, M. O'Connor, N. Chatterjee, J. Pool, Y. Kwon, and S. W. Keckler, "Compressing DMA engine: Leveraging activation sparsity for training deep neural networks," in Proc. of the Intl. Symp. on High Performance Computer Xrchitecture, 2018.

M. Riera, J. M. Arnau, and A. Gonzalez, "Computation reuse in DNNs by exploiting input similarity," Proc. of the Intl. Symp. on Computer Architecture, 2018.

M. Song, J. Zhang, H. Chen, and T. Li, "Towards efficient microarchitectural design for accelerating unsupervised GAN-based deep learning," in Proc. of the Intl. Symp. on High Performance Computer Architecture, 2018.

M. Song, J. Zhao, Y. Hu, J. Zhang, and T. Li, "Prediction based execution on deep neural networks," Proc. of the Intl. Symp. on Computer Architecture, 2018.

M. Song, K. Zhong, J. Zhang, Y. Hu, D. Liu, W. Zhang, J. Wang, and T. Li, "In-situ AI: towards autonomous and incremental deep learning for IoT systems," in Proc. of the Intl. Symp. on High Performance Computer Architecture, 2018.

N. Muralimanohar, R. Balasubramonian, and N. P. Jouppi, "Cacti 6.0: A tool to model large caches," HP laboratories, pp. 22-31, 2009.

N. P. Jouppi, A. B. Kahng, N. Muralimanohar, and V. Srinivas, "Cacti-io: Cacti with off-chip power-area-timing models," VLSI, pp. 1254-1267, 2015.

Onur Mutlu, Thomas Moscibroda, "Stall-Time Fair Memory Access Scheduling for Chip Multiprocessors," MICRO, pp. 146-160, 2007.

P. Meaney, L. Curley, G. Gilda, M. Hodges, D. Buerkle, R. Siegl, and R. Dong, "The IBM z13 Memory Subsystem for Big Data," IBM Journal of Research and Development, 2015.

P. Pessl, D. Gruss, C. Maurice, M. Schwarz, and S. Mangard, "Drama: Exploiting dram addressing forcross-cpu attack," USENIX Security Symposium, vol. pp. 565-581, 2016.

Q. Guo, N. Alachiotis, B. Akin, F. Sadi, G. Xu, T. M. Low, L. Pileggi, J. C. Hoe, and F. Franchetti, "3d-stacked memory-side acceleration: Accelerator and system design," WoNDP, 2014.

R. Yazdani, M. Riera, J.-M. Arnau, and A. Gonzalez, "The dark side of DNN pruning," Proc. of the Intl. Symp. on Computer Architecture, 2018.

S. Venkataramani, A. Ranjan, S. Banerjee, D. Das, S. Avancha, A. Jagannathan, A. Durg, D. Nagaraj, B. Kaul, P. Dubey, and A. Raghunathan, "Scaledeep: A scalable compute architecture for learning and evaluating deep networks," In Proc. of the Intl. Symp. on Computer Architecture, 2017.

Samuel Williams, Andrew Waterman, and David Patterson, "Roofline: An Insightful Visual Performance Model for Floating-Point Programs and Multicore Architectures," Communications of the ACM, 2009.

Udit Gupta, Xiaodong Wang, Maxim Naumov, Carole-Jean Wu, Brandon Reagen, David Brooks, Bradford Cottel, Kim Hazelwood, Bill Jia, Hsien-Hsin S. Lee, Andrey Malevich, Dheevatsa Mudigere, Mikhail Smelyanskiy, Liang Xiong, Xuan Zhang, "The architectural implications of facebook's dnn-based personalized recommendation," arXiv preprint arXiv:1906.03109, 2019. [Online], Available: https://arxiv.org/abs/1906.03109.

Xiao Zhang, Sandhya Dwarkadas, Kai Shen, "Towards practical page coloring-based multicore cache management," EuroSys, pp. 89-102, 2009.

Y. L. Youngeun Kwon and M. Rhu, "Tensordimm: A practical nearmemory processing architecture for embeddings and tensor operations in deep learning," MICRO, pp. 740-753, 2019.

Y. Shen, M. Ferdman, and P. Milder, "Maximizing CNN accelerator efficiency through resource partitioning," in Proc. of the Intl. Symp. on Computer Architecture, 2017.

Z. Zhao, L. Hong, L. Wei, J. Chen, A. Nath, S. Andrews, A. Kumthekar, M. Sathiamoorthy, X. Yi, and E. Chi, "Recommending what video to watch next: A multitask ranking system," in Proceedings of the 13th ACM Conference on Recommender Systems, ser. ReeSys '19. New York, NY, USA: ACM, 2019, pp. 43-51. [Online]. Available: http://doi.acm.org/10.1145/3298689.3346997.

"Breakthroughs in matching and recommendation algorithms by alibaba." [Online]. Available: https://www.alibabacloud.com/blog/breakthroughs-in-matchingand-recommendation-algorithms-by-alibaba 593976.

"Caffe2." [Online]. Available: https://caffe2.ai///. Captured May 14, 2019.

A. Eisenman, M. Naumov, D. Gardner, M. Smelyanskiy, S. Pupyrev, K. Hazelwood, A. Cidon, and S. Katti, "Bandana: Using nonvolatile memory for storing deep learning models," arXiv preprint arXiv:1811.05922, 2018.

A. Jain, A. Phanishayee, J. Mars, L. Tang, and G. Pekhimenko, "Gist: Efficient data encoding for deep neural network training," Proc. of the Intl. Symp. on Computer Architecture, 2018.

Amazon Personalize, https://aws.amazon.com/personalize/. Captured Dec. 9, 2019.

Amin Farmahini-Farahani, Jung Ho Ahn, Katherine Morrow, and Nam Sung Kim, "NDA: Near-DRAM Acceleration Architecture Leveraging Commodity DRAM Devices and Standard Memory Modules," HPCA, 2015.

B. Feinberg, S. Wang, and E. Ipek, "Making memristive neural network accelerators reliable," in Proc. of the Intl. Symp. on High Performance Computer Architecture, 2018.

B. Hong, G. Kim, J. H. Ahn, Y. Kwon, H. Kim, and J. Kim, "Accelerating linked-list traversal through near-data processing," PACT, pp. 113-124, 2016.

(56) References Cited

OTHER PUBLICATIONS

C. De Sa, M. Feldman, C. R'e, and K. Olukotun, "Understanding and optimizing asynchronous low-precision stochastic gradient descent," in Proc. of the Intl. Symp. on Computer Architecture, 2017.

Carole-Jean Wu, David Brooks, Udit Gupta, Hsien-Hsin Lee, and Kim Hazelwood, "Deep learning: Its not all about recognizing cats and dogs," ACM Sigarch. [Online]. Available: https://www.sigarch.org/deeplearning-its-not-all-about-recognizing-cats-and-dogs/. Nov. 7, 2019.

D. Kim, J. Kung, S. Chai, S. Yalamanchili, and S. Mukhopadhyay, "Neurocube: A programmable digital neuromorphic architecture with high-density 3D memory," in Proc. of the Intl. Symp. on Computer Architecture, 2016.

H. Cheng, L. Koc, J. Harmsen, T. Shaked, T. Chandra, H. Aradhye, G. Anderson, G. Corrado, W. Chai, M. Ispir, R. Anil, Z. Haque, L. Hong, V. Jain, X. Liu, and H. Shah, "Wide & deep learning for recommender systems," in Proceedings of the 1st Workshop on Deep Learning for Recommender Systems, DLRS@RecSys 2016, Boston, MA, USA, Sep. 15, 2016, 2016, pp. 7-10.

H. Guo, R. Tang, Y. Ye, Z. Li, X. He, and Z. Dong, "Deepfm: An end-to-end wide & deep learning framework for CTR prediction," CoRR, vol. abs/1804.04950, 2018. [Online]. Available: http://arxiv.org/abs/1804.04950.

H.-T. Cheng, L. Koc, J. Harmsen, T. Shaked, T. Chandra, H. Aradhye, G. Anderson, G. Corrado, W. Chai, M. Ispir et al., "Wide & deep learning for recommender systems," in Proceedings of the 1st Workshop on Deep Learning for Recommender Systems. ACM, 2016, pp. 7-10.

Hadi Asghari-Moghaddam, Young Hoon Son, Jung Ho Ahn, Nam Sung Kim, "Chameleon: Versatile and Practical Near-DRAM Acceleration Architecture for Large Memory Systems," MICRO, 2016.

Hanhwi Jang, Joonsung Kim, Jae-Eon Jo, Jaewon Lee, Jangwoo Kim, "MnnFast: a fast and scalable system architecture for memoryaugmented neural networks," ISCA, 2019.

J. Ahn, S. Hong, S. Yoo, O. Mutlu, and K. Choi, "A scalable processing-in-memory accelerator for parallel graph processing," ISCA, pp. 105-117, 2015.

J. Albericio, P. Judd, T. Hetherington, T. Aamodt, N. E. Jerger, and A. Moshovos, "Cnvlutin: Ineffectual-neuron-free deep neural network computing," in Proc. of the Intl. Symp. on Computer Architecture, 2016.

J. E. Stone, D. Gohara, and G. Shi, "Opencl: A parallel programming standard for heterogeneous computing systems," IEEE Computing in Science and Engineering, vol. 12, No. 3, 2010.

Jaekyu Lee, Hyesoon Kim, and Richard Vuduc, "When Prefetching Works, When It Doesn't, and Why," ACM TACO, vol. 9, No. 1, 2012.

Jiawen Liu, Hengyu Zhao, Matheus Almeida Ogleari, Dong Li, Jishen Zhao, "Processing-in-memory for energy-efficient neural network training: A heterogeneous approach," MICRO, pp. 655-668, 2018.

Jonathan Vanian, Fortune, "Eye on A.I—Retail Has Big Hopes for A.I. But Shoppers May Have Other Ideas", from https://fortune.com/2019/04/30/artificial-intelligence-walmartstores/. Apr. 30, 2019.

Joseph Izraelevitz, Jian Yang, Lu Zhang, Juno Kim, Xiao Liu, Amirsaman Memaripour, Yun Joon Soh, Zixuan Wang, Yi Xu, Subramanya R. Dulloor, Jishen Zhao, Steven Swanson, "Basic Performance Measurements of the Intel Optane DC Persistent Memory Module," arXiv preprint arXiv:1903.05714, 2018.

Junwhan Ahn, Sungjoo Yoo, Onur Mutlu, Kiyoung Choi, "Pim-enabled instructions: A low-overhead, locality-aware processing-in-memory architecture," ISCA, pp. 336-348, 2015.

K. Chen, S. Li, N. Muralimanohar, J. H. Ahn, J. B. Brockman, and N. P. Jouppi, "Cacti-3dd: Architecture-level modeling for 3d die-stacked dram main memory," VLSI, pp. 33-38, 2012.

K. Hazelwood, S. Bird, D. Brooks, S. Chintala, U. Diril, D. Dzhulgakov, M. Fawzy, B. Jia, Y. Jia, A. Kalro et al., "Applied machine learning at Facebook: a datacenter infrastructure perspective," in Proceedings of the IEEE International Symposium on High Performance Computer Architecture (HPCA). IEEE, 2018, pp. 620-629.

K. Hegde, J. Yu, R. Agrawal, M. Yan, M. Pellauer, and C. W. Fletcher, "UCNN: Exploiting computational reuse in deep neural networks via weight repetition," Proc of the Intl Symp on Computer Architecture, 2018.

K. Hsieh, E. Ebrahim, G. Kim, N. Chatterjee, M. O'Connor, N. Vijaykumar, O. Mutlu, and S. W. Keckler, "Transparent offloading and mapping (tom): Enabling programmer-transparent near-data processing in gpu systems," ISCA, pp. 204-216, 2016.

K. Hsieh, S. Khan, N. Vijaykumar, K. K. Chang, A. Boroumand, S. Ghose, and O. Mutlu, "Accelerating pointer chasing in 3d-stacked memory: Challenges, mechanisms, evaluation," ICCD, pp. 25-32, 2016.

Krishnaswamy Vishwanathan, Intel Memory Latency Checker (MLC), https://software.intel.com/enus/articles/intelr-memory-latency-checker. Nov. 21, 2013.

Lifeng Nai, Ramyad Hadidi, Jaewoong Sim, Hyojong Kim, Pranith Kumar, Hyesoon Kim, "Graphpim: Enabling instruction-level pim offloading in graph computing frameworks," HPCA, 2017.

M. Drumond, A. Daglis, N. Mirzadeh, D. Ustiugov, J. Picorel, B. Falsafi, B. Grot, and D. Pnevmatikatos, "The mondrian data engine," ISCA, pp. 639-651, 2017.

M. Gao, G. Ayers, and C. Kozyrakis, "Practical near-data processing for in-memory analytics frameworks," PACT, pp. 113-124, 2015.

M. Gao, J. Pu, X. Yang, M. Horowitz ,and C. Kozyrakis, "Tetris: Scalable and efficient neural network acceleration with 3d memory," ASPLOS, pp. 751-764, 2017.

M.Gorman, "Understanding the Linux virtual memory manager." Prentice Hall Upper Saddle River, 2004.

Micron, "MT40A2G4, MT40A1G8, MT40A512M16, 8Gb: x4, x8, x16 DDR4 SDRAM Features." Oct. 2018.

Miguel Campo, Cheng-Kang Hsieh, Matt Nickens, J.J. Espinoza, Abhinav Taliyan, Julie Rieger, Jean Ho, and Bettina Sherick, "Competitive analysis system for theatrical movie releases based on movie trailer deep video representation," 2018. [Online], Available: https://arxiv.org/abs/1807.04465.

MLPerf, https://mlperf.org/. Captured Nov. 24, 2019.

N. Jouppi et al., "In-datacenter performance analysis of a tensor processing unit," in Proc. of the Intl. Symp. on Computer Architecture, 2017.

P. Covington, J. Adams, and E. Sargin, "Deep neural networks for youtube recommendations," in Proceedings of the 10th ACM Conference on Recommender Systems, ser. ReeSys '16. New York, NY, USA: ACM, 2016, pp. 191-198. [Online]. Available: http://doi.acm.org/10.1145/2959100.2959190.

R. Adolf, S. Rama, B. Reagen, G.-Y. Wei, and D. Brooks, "Fathom: Reference workloads for modem deep learning methods," in Proceedings of the IEEE International Symposium on Workload Characterization (IISWC). IEEE, 2016, pp. 1-10.

S. Han, X. Liu, H. Mao, J. Pu, A. Pedram, M. A. Horowitz, and W. J. Dally, "Eie: efficient inference engine on compressed deep neural network," in Proceedings of the ACM/IEEE 43rd Annual International Symposium on Computer Architecture (ISCA). IEEE, 2016, pp. 243-254.

S. Liu, Z. Du, J. Tao, D. Han, T. Luo, Y. Xie, Y. Chen, and T. Chen, "Cambricon: An instruction set architecture for neural networks," in Proc. of the Intl. Symp. on Computer Architecture, 2016.

Using Machine Learning on Compute Engine to Make Product Recommendations. Google Cloud Platform, https://cloud.google.com/solutions/recommendations-using-machine-learning-on-compute-engine. Captured Jul. 27, 2017.

V. Aklaghi, A. Yazdanbakhsh, K. Samadi, H. Esmaeilzadeh, and R. K. Gupta, "SnaPEA: Predictive early activation for reducing computation in deep convolutional neural networks," in Proc. of the Intl. Symp. on Computer Architecture, 2018.

Y. Kim, W. Yang, and O. Mutlu, "Ramulator: A fast and extensible dram simulator," IEEE Computer architecture letters, vol. 15, No. 1, pp. 45-49, 2015.

(56) References Cited

OTHER PUBLICATIONS

Y.-H. Chen, T. Krishna, J. S. Emer, and V. Sze, "Eyeriss: An energyefficient reconfigurable accelerator for deep convolutional neural networks," IEEE Journal of Solid-State Circuits, vol. 52, No. 1, pp. 127-138, 2017.

* cited by examiner

COMPUTER MEMORY MODULE PROCESSING DEVICE WITH CACHE STORAGE

CROSS REFERENCE TO OTHER APPLICATIONS

This application claims priority to U.S. Provisional Patent Application No. 62/951,403 entitled ACCELERATING PERSONALIZED RECOMMENDATION WITH NEAR-MEMORY PROCESSING filed Dec. 20, 2019 which is incorporated herein by reference for all purposes.

BACKGROUND OF THE INVENTION

Personalized recommendation is the task of recommending content to users based on their preferences and previous interactions. Personalized recommendation is a fundamental building block of many internet services used by search engines, social networks, online retail, and content streaming. Delivering accurate recommendations in a timely and efficient manner can be computationally demanding and challenging due to the large volume of data that needs to be processed to determine which recommendations to make. For example, with video ranking, a small number of videos, out of potentially millions, may need to be recommended to each user. Thus, it would be beneficial to develop techniques, including improved hardware, directed toward making personalized recommendation systems more computationally efficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device (e.g., an application-specific integrated circuit chip) configured to improve the efficiency of computer memory processing is disclosed. The disclosed device includes various components (e.g., integrated circuit components): a memory module processing unit and an interface. The memory module processing unit is configured to receive an instruction to obtain values stored in one or more memory components and process the obtained values to return a processed result. The memory module processing unit is also configured to store the obtained values in a cache based on one or more criteria. The memory module processing unit is configured to be included on a computer memory module configured to be installed in a computer system. The interface is configured to communicate with the one or more memory components included on the computer memory module. A practical and technological benefit of the disclosed device is increased memory throughput. For example, in some embodiments, the disclosed device is utilized to accelerate personalized recommendation systems.

Many personalized recommendation systems utilize deep learning to improve accuracy and deliver a better user experience. Delivering accurate recommendations in a timely and efficient manner can be computationally demanding and challenging due to the large volume of data that needs to be processed to determine which recommendations to make. In terms of deep learning, this can mean looking up comparatively small working sets (e.g., on the order of megabytes) in large embedding tables (e.g., on the order of tens to hundreds of gigabytes). These sparse lookup operations, which are typically combined with pooling operations, are referred to as embedding operations and, in many scenarios, dominate the run-time of personalized recommendation systems. An advantage of the disclosed device is improved run-time performance of embedding operations, including sparse lookup and pooling, for personalized recommendation systems. In various embodiments, a memory module processing unit that is configured to perform embedding operations is included on a computer memory module (e.g., a dual-inline memory module (DIMM)) where the data associated with the embedding operations is located, which has the benefit of eliminating external (off-chip) memory bottlenecks and exposing the embedding operations to higher memory-side internal bandwidth. Furthermore, in various embodiments, caches are included on the computer memory module. As described in more detail herein, improved run-time performance can be achieved by using these memory-side caches to take advantage of embedding operation patterns (e.g., temporal reuse locality).

Embedding operations typically exhibit gather-reduce patterns in which the specific element-wise reduction operation can vary. An example of an embedding operation is SparseLengthsSum (SLS), which includes a sparse lookup into a large embedding table followed by a summation of looked up elements. A vector result from an embedding table lookup is referred to herein as an embedding vector. Another example of an embedding operation, is SparseLengthsWeightedSum8BitsRowwise, which is a variant in the SparseLengths family of embedding operations and performs a gather-reduce embedding operation with quantized, weighted summation. The SLS operator has low compute but higher memory requirements. Thus, SLS and its variants can introduce memory performance bottlenecks. It would be beneficial to develop techniques to offload SLS-family or similar embedding operations to improve system throughput. Stated alternatively, it would be advantageous to have a system that can perform gather-reduce operations near memory such that only the final output from the reduction is returned to a central processing unit (CPU). This would improve performance in many personalized recommendation systems that use SLS-family or similar operations.

Figure 1:
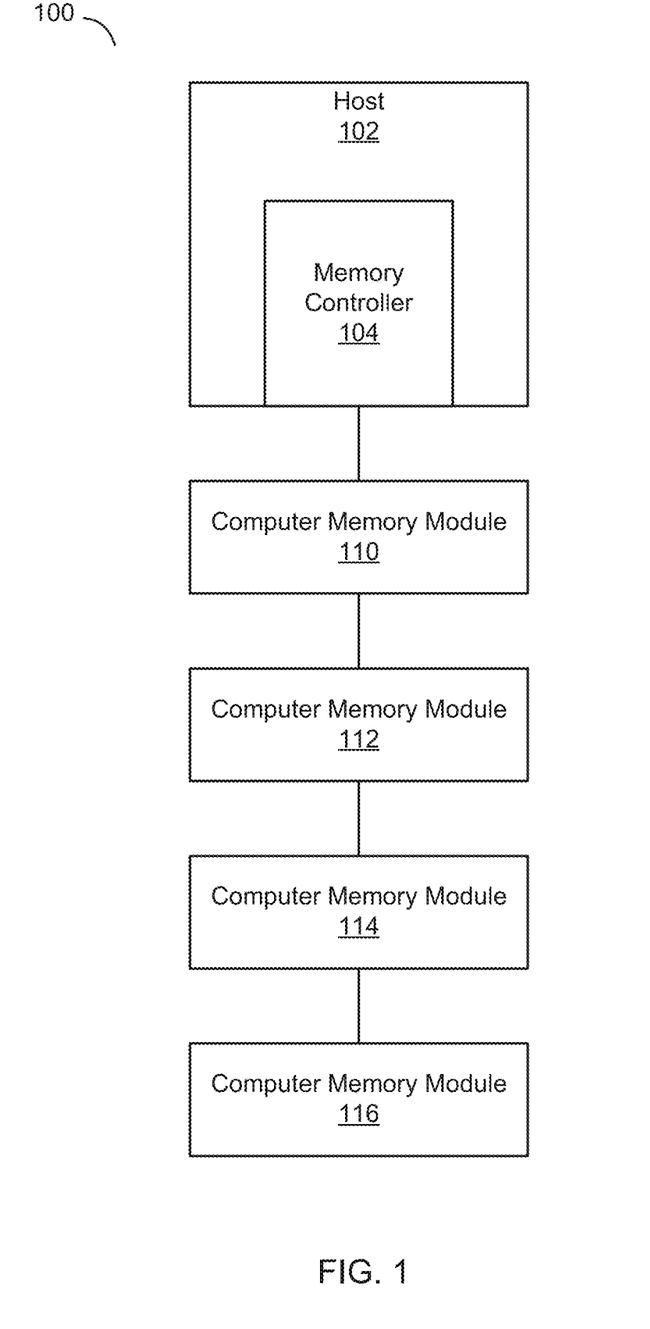
FIG. 1 is a block diagram illustrating an embodiment of a computer system that includes computer memory modules.

FIG. 1 is a block diagram illustrating an embodiment of a computer system that includes computer memory modules. For example, system 100 may be applied to store data that a personalized recommendation system accesses and processes. In the example shown, system 100 includes multiple computer memory modules such as computer memory modules 110, 112, 114, and 116 connected to host 102. In the example shown, host 102 includes memory controller 104. System 100 may include fewer or more computer memory modules. For example, the number of computer memory modules can be scaled up or down depending on the intended computational and data requirements. In some embodiments, the computer memory modules, such as 110, 112, 114, and 116, are communicatively connected to one another and/or memory controller 104 via a bus, e.g., a memory bus. In some embodiments, one or more of the computer memory modules of system 100, such as computer memory modules 110, 112, 114, and 116, are DIMMs. Each computer memory module may receive instructions from a host-side memory controller, such as memory controller 104, to retrieve and/or process data stored in the computer memory module.

Figure 2:
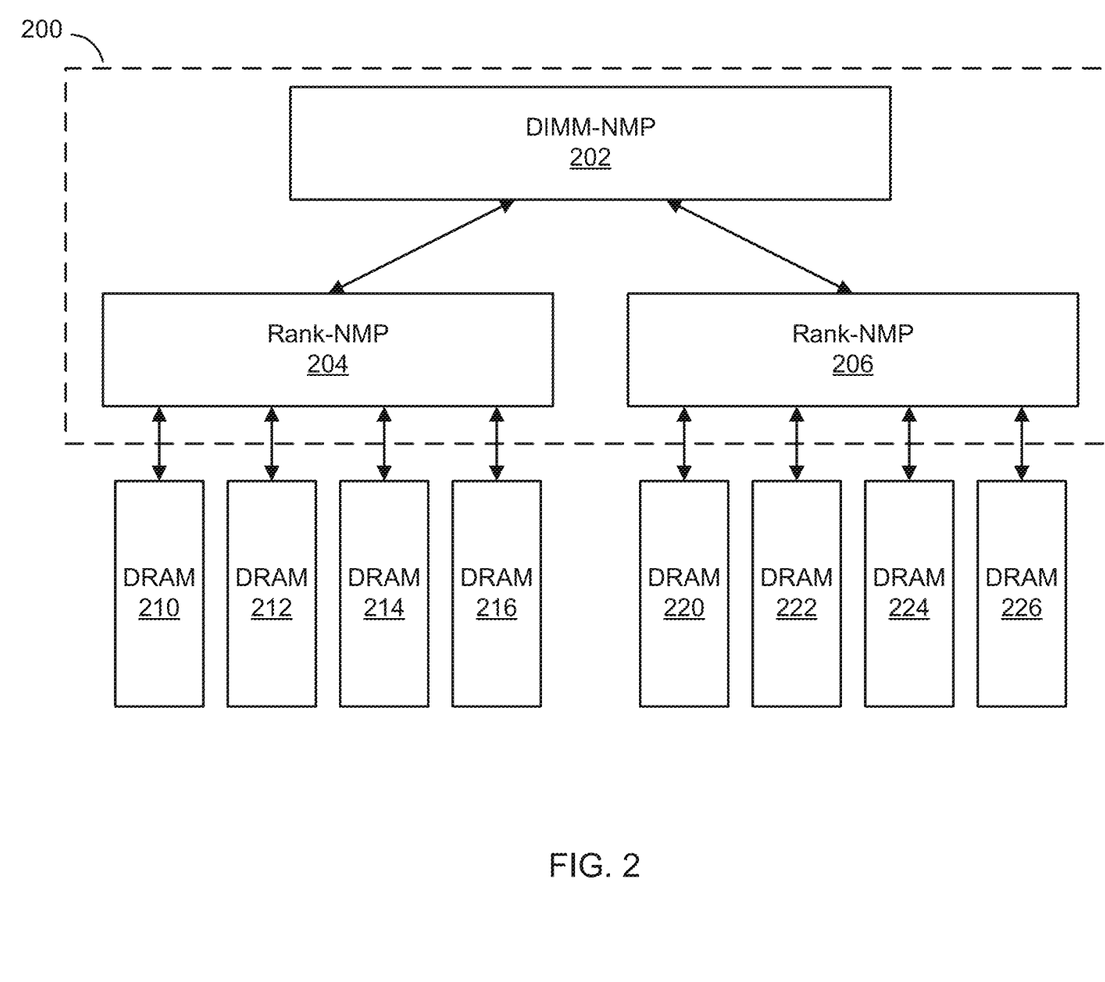
FIG. 2 is a block diagram illustrating an embodiment of a computer memory module that includes a memory module processing unit.

FIG. 2 is a block diagram illustrating an embodiment of a computer memory module that includes a memory module processing unit. In some embodiments, the computer memory module is computer memory module 110, 112, 114 and/or 116 of FIG. 1. In various embodiments, the computer memory module is a DIMM. In some embodiments, memory module processing unit 200 resides on a buffer chip (e.g., a buffer chip on a DIMM). In the example shown, memory module processing unit 200 is communicatively connected to a plurality of memory components, which, in this example, are dynamic random-access memory (DRAM) devices (e.g., DRAM chips) 210, 212, 214, 216, 220, 222, 224, and 226. In the example shown, memory module processing unit 200 includes DIMM near-memory processing (NMP) unit 202 and rank-NMP processing units 204 and 206. DIMM-NMP 202 dispatches instructions received from a DIMM interface (e.g., instructions from memory controller 104 of FIG. 1) to rank-NMPs 204 and 206. Rank-NMP units 204 and 206 interface with the DRAM memory components. In various embodiments, each rank-NMP unit interfaces with one set of DRAM chips that can be accessed simultaneously (one memory rank). DRAM rank-level parallelism can be exploited by computing directly and locally on data retrieved from concurrently activated ranks. Memory module processing unit 200 bridges the memory channel interface from a host (e.g., host 102 of FIG. 1) and a standard DRAM device interface, e.g., by using data (DQ) and command/address (C/A) pins connecting rank-NMP units and DRAM devices.

In the example shown, memory module processing unit 200 includes one DIMM-NMP unit communicatively connected to two rank-NMP units. Other configurations are also possible. For example, a DIMM with four memory ranks may include four rank-NMP units, a DIMM with eight memory ranks may include eight rank-NMP units, and so forth. Similarly, the number of DRAM devices per rank-NMP unit is not limited to the example illustrated. It is possible to have more or fewer devices per memory rank. The approach shown is also scalable in that larger memory capacity can be provided by populating a single memory channel with multiple DIMMs equipped with memory module processing units such as memory module processing unit 200. Multiple memory channels may also be utilized with software coordination.

Figure 4:
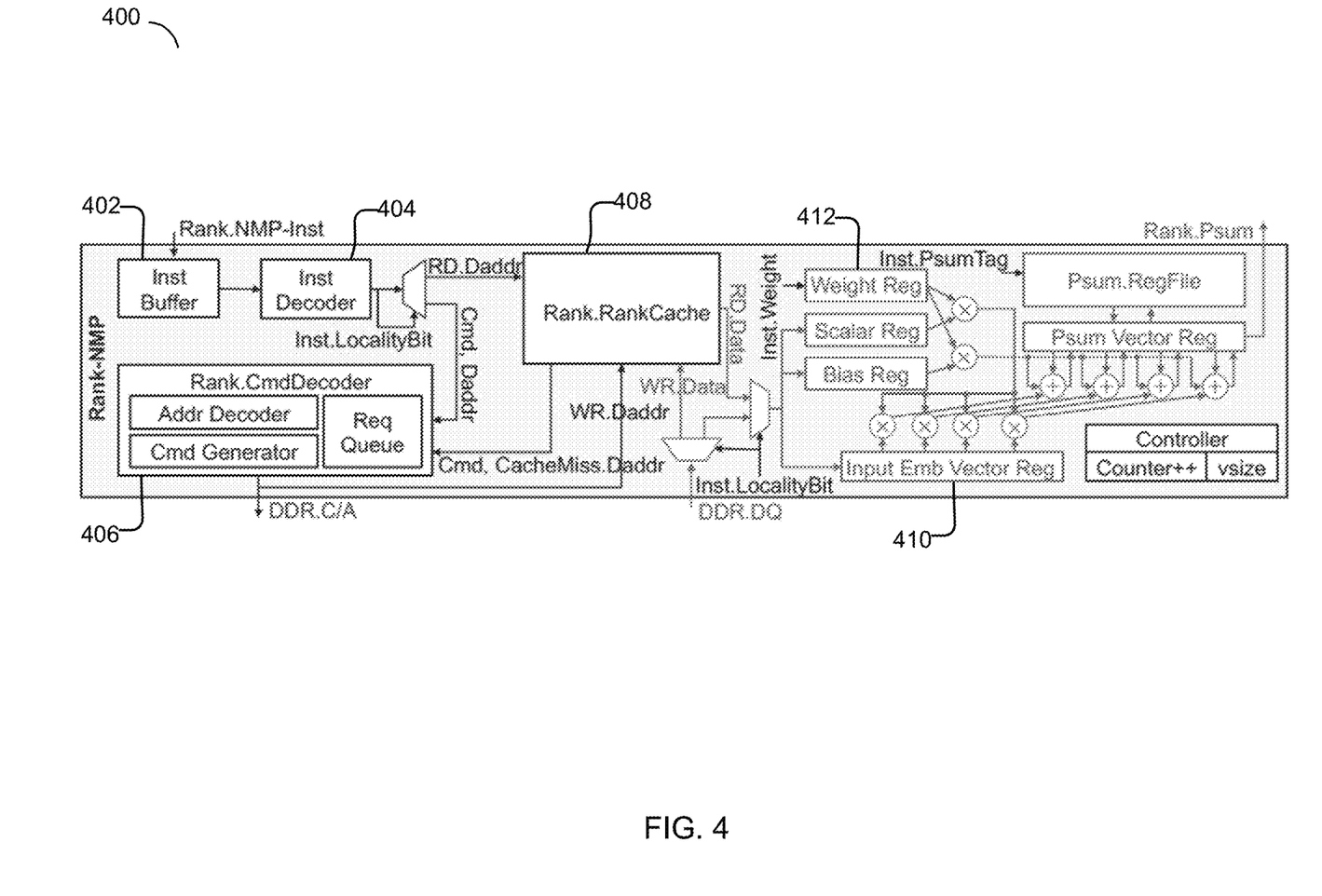
FIG. 4 is a diagram illustrating an embodiment of a rank-NMP unit.
Figure 5:
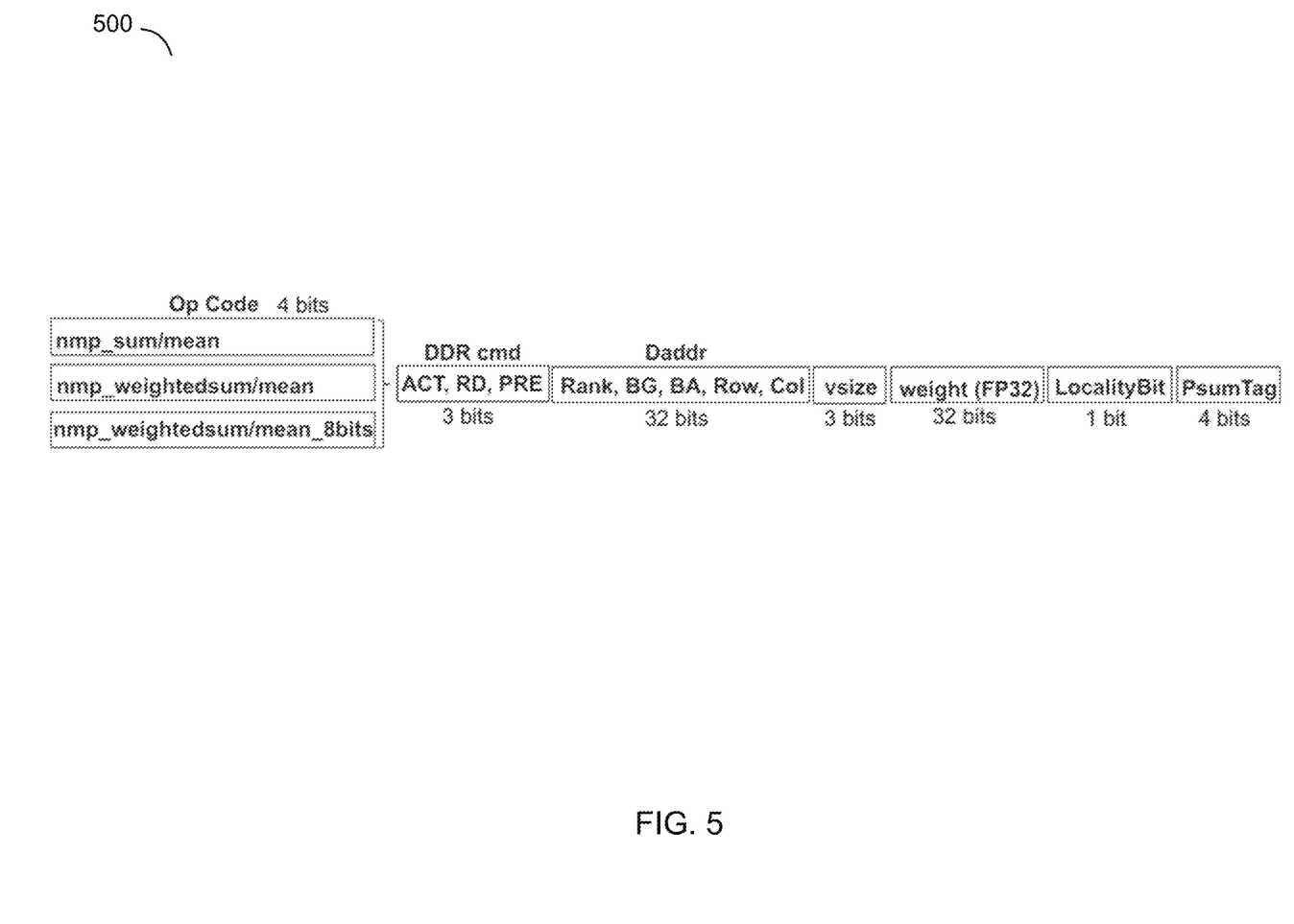
FIG. 5 is a diagram illustrating an embodiment of an NMP-Inst format.

In various embodiments, a host-side memory controller (e.g., memory controller 104 of FIG. 1) communicates with memory module processing unit 200 by sending customized compressed-format NMP instructions (referred to herein and shown in the following figures as NMP-Inst, an example format of which is shown in FIG. 5) through a conventional memory channel interface and memory module processing unit 200 returns accumulated embedding pooling results (referred to herein and shown in the following figures as DIMM.Sum) to the host. In some embodiments, NMP-Inst is received by DIMM-NMP 202 and DIMM.Sum is returned by DIMM-NMP 202. In various embodiments, regular double data rate 4 (DDR4)-compatible C/A and data signals (referred to herein and shown in the following figures as DDR.C/A and DDR.DQ, respectively) are decoded by memory module processing unit 200 from the NMP-Insts and then sent to all DRAM devices across all parallel ranks in a DIMM (e.g., sent by the rank-NMP units). (See FIGS. 3 and 4 and the associated descriptions for additional details regarding NMP-Inst, DIMM.Sum, DDR.C/A, and DDR.DQ). By placing logic at rank-level, memory module processing unit 200 is able to issue concurrent requests to the parallel ranks and utilize, e.g., for SLS-family operators, the higher internal bandwidth present under one memory channel. Its effective bandwidth thus aggregates across all the parallel activated ranks. For example, with a memory configuration of four DIMMs as shown in FIG. 1 and two ranks per DIMM as shown in FIG. 2, it is possible to achieve a factor of 8 higher internal bandwidth.

In various embodiments, DIMM-NMP 202 first receives an NMP-Inst through the DIMM interface and then forwards the NMP-Inst to the corresponding rank-NMP units (e.g., rank-NMP units 204 and 206) based on rank address. The rank-NMP units decode and execute the NMP-Inst to perform rank-level computations concurrently. In various embodiments, each rank-NMP unit generates its own partial sum (Psum) of a data vector that is returned to DIMM-NMP 202. DIMM-NMP 202 can then perform element-wise accumulation of partial sum vectors from parallel ranks to arrive at the DIMM.Sum result to be returned to the host. Psums may also be accumulated across multiple memory module processing units with software coordination. In various embodiments, DIMM-NMP and rank-NMP units are implemented as separate logical units even though they reside on the same buffer chip. An advantage of this configuration is easier scaling to DIMMs with a different number of ranks.

In various embodiments, memory module processing unit 200 is implemented as specialized logic that supports SLS-family operators instead of general-purpose computation. This specialized logic can be limited to reside on a buffer chip within a DIMM so as to not require any changes to commodity memory component (e.g., DRAM) devices. In some embodiments, separate logic and connections to memory component (e.g., DRAM) devices (not shown in FIG. 2) are utilized to handle general-purpose computation and/or memory operations that do not use customized compressed-format NMP instructions (e.g., memory operations that do not use NMP-Inst format 500 of FIG. 5). The separate logic to handle general-purpose computations may also reside on the buffer chip on which memory module processing unit 200 resides. Stated alternatively, memory module processing unit 200 may be included as logic that is additional to standard logic (to handle general-purpose computation) already on the buffer chip.

Figure 3:
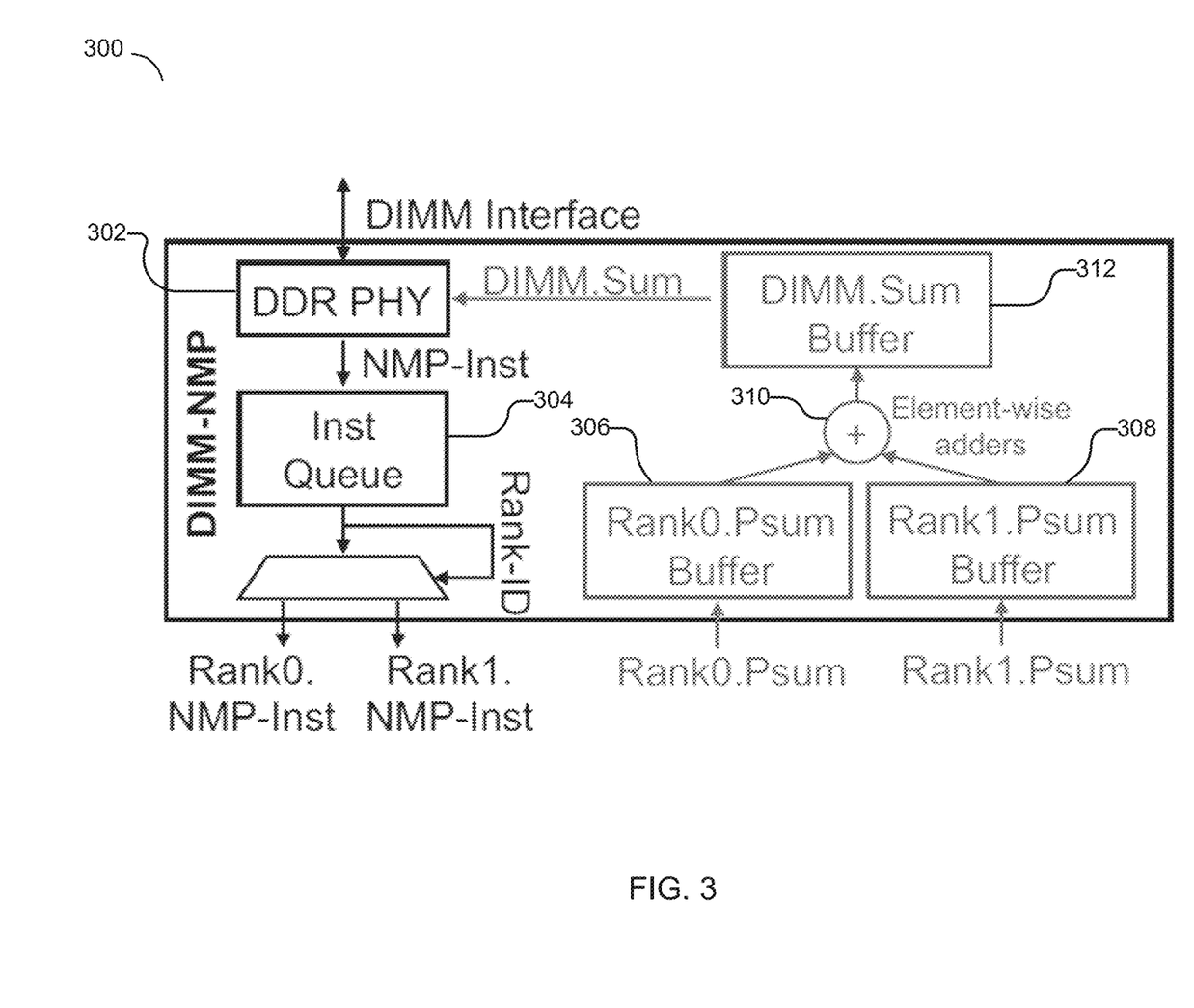
FIG. 3 is a diagram illustrating an embodiment of a DIMM-NMP unit.

FIG. 3 is a diagram illustrating an embodiment of a DIMM-NMP unit. In some embodiments, DIMM-NMP system 300 is DIMM-NMP 202 of FIG. 2. In the example illustrated, an NMP-Inst is received from a DIMM interface by DDR physical interface DDR PHY 302. As shown, DIMM-NMP system 300 dispatches the NMP-Inst received from the DIMM interface via DDR PHY 302. In various embodiments, DDR PHY 302 utilizes a protocol engine similar to the design of a conventional DIMM buffer chip that relays DRAM C/A and DQ signals from and to a host-side memory controller (e.g., memory controller 104 of FIG. 1). In the example shown, the NMP-Inst is dispatched to and queued in Inst Queue 304. In various embodiments, Inst Queue 304 multiplexes the NMP-Inst to corresponding memory ranks based on a memory rank identification number (Rank-ID). In the example shown, rank-level instructions (Rank0.NMP-Inst and Rank1.NMP-Inst) are sent to two rank-NMP units (e.g., rank-NMP units 204 and 206 of FIG. 2). The NMP-Inst may be multiplexed to more rank-NMP units when DIMM-NMP system 300 is communicatively connected to more rank-NMP units (e.g., 4, 8, etc. units).

In the example illustrated, DIMM-NMP system 300 also receives data from two rank-NMP units (corresponding to the two rank-NMP units that DIMM-NMP system 300 is communicatively connected to in this particular example). As described above, each rank-NMP unit may generate a Psum. In the example shown, DIMM-NMP system 300 buffers the Psums (Rank0.Psum and Rank1.Psum) accumulated by each rank-NMP unit in Rank0.Psum Buffer 306 and Rank1.Psum Buffer 308. In various embodiments, Rank0.Psum Buffer 306 and Rank1.Psum Buffer 308 include local registers. In the example shown, a summation of the Psums in Rank0.Psum Buffer 306 and Rank1.Psum Buffer 308 is performed by element-wise adders 310. In some embodiments, element-wise adders 310 is implemented using an adder tree. The number of inputs to the adder tree is based on the number of memory ranks associated with DIMM-NMP system 300. The result of the summation (DIMM. Sum) is stored in DIMM. Sum Buffer 312. In various embodiments, DIMM.Sum Buffer 312 includes a local register. In the example shown, DIMM.Sum is sent back to the host-side memory controller via DDR PHY 302. Stated alternatively, DIMM. Sum is sent back to the host-side memory controller using the same interface for receiving the NMP-Inst.

FIG. 4 is a diagram illustrating an embodiment of a rank-NMP unit. In some embodiments, rank-NMP system 400 is rank-NMP 204 or 206 of FIG. 2. In various embodiments, rank-NMP system 400 translates an NMP-Inst into low-level DDR C/A commands and manages memory-side caching and local computation of SLS-family (or other) operators. In the example illustrated, a Rank.NMP-Inst (e.g., Rank0.NMP-Inst or Rank1.NMP-Inst as shown in FIG. 3), is received by instruction buffer 402 (Inst Buffer). In various embodiments, instruction buffer 402 includes a local register. The received Rank.NMP-Inst instruction is decoded by a decoder, which in this example is instruction decoder 404 (Inst Decoder). The output of instruction decoder 404 includes control signals and register inputs.

In various embodiments, to address C/A bus limitations, all of the DDR commands for a single SLS vector are embedded in one NW-Inst. An example NMP-Inst format is shown in FIG. 5. In NMP-Inst format 500, the DDR cmd field includes three bits to indicate the presence or absence (1-bit corresponds to presence and 0-bit corresponds to absence) of the DDR commands for activating a row (ACT), reading (RD), and pre-charging (PRE). Including these three bits in one field has the advantage of allowing for three DDR commands to be sent in one cycle instead of three cycles. This compressed instruction format is particularly advantageous when accessing multiple memory ranks because more DDR commands need to be issued due to there being multiple memory ranks, which can exhaust the available C/A bandwidth of a conventional memory interface. The compressed instruction format conserves C/A bandwidth (see FIG. 6 for an example), which allows rank-level parallelism to be better exploited. In NMP-Inst format 500, the vsize (vector size) field is a 3-bit number indicating the size of the embedding vector to be read from memory. Stated alternatively, vsize indicates how much data to read. In NMP-Inst format 500, the Daddr (DRAM address) field indicates the location from which data should be read. In the example shown in FIG. 5, the Daddr field is a 32-bit number that uniquely specifies memory address location according to memory rank (Rank), memory bank group (BG), memory bank address (BA), row address (Row), and column address (Col). As an example, if a vector with vsize=2 requires ACT/PRE from a row buffer miss, the command sequence to DRAM devices for the NMP-Inst is {PRE, ACT Row, RD Col, RD Col+8} decoded from {ACT, RD, PRE} and vsize tags.

In the example shown in FIG. 4, information corresponding to the DDR cmd and Daddr fields of NMP-Inst format 500 of FIG. 5 are transmitted to local command decoder 406 (Rank.CmdDecoder) to generate standard DDR-style ACT/RD/PRE commands (DDR.C/A) to communicate with DRAM devices. In the example illustrated, local command decoder 406 includes components for generating DDR command (Cmd Generator) and decoding memory addresses (Addr Decoder). In various embodiments, DDR commands are set at runtime by the host-side memory controller based on the relative physical address location of consecutive embedding accesses, which keeps local command decoder 406 lightweight, as the host-side memory controller has already performed the tasks of request reordering, arbitration, and clock and refresh signal generation.

In the example illustrated, memory-side cache 408 (Rank.RankCache) is included in rank-NMP system 400. A memory-side cache is used to exploit embedding vector reuse. In various embodiments, a locality bit in the NMP-Inst is used to determine whether an embedding vector should be cached or bypassed. For example, a locality bit field (LocalityBit) is included in NMP-Inst format 500 of FIG. 5. A cached embedding vector in memory-side cache 408 can be linked to its memory address (e.g., the Daddr field of NMP-Inst format 500 of FIG. 5). If the locality bit associated with a lookup is high, the embedding vector is searched for in memory-side cache 408. If the locality bit associated with the lookup is low, memory-side cache 408 is bypassed and the lookup is forwarded to local command decoder 406 to initiate a DRAM read. Furthermore, as shown in FIG. 4, memory-side cache 408 is communicatively connected to local command decoder 406 so that a DRAM read can also be initiated if a cache miss occurs.

In the example illustrated, embedding vectors retrieved from DRAM can be cached (data path from DDR.DQ to memory-side cache 408). The locality bit in the NMP-Inst can be used to indicate which looked up embedding vectors should be cached. In the example shown, embedding vectors, whether retrieved from memory components (e.g., DRAM devices) or memory-side cache 408, are loaded into input embedding vector registers 410 (Input Emb Vector Reg). In the example shown, a wide range of operations can be performed on a retrieved embedding vector stored in input embedding vector registers 410. Stated alternatively, the data paths in rank-NMP system 400 support a range of SLS-family (or other) operators. For example, for weighted sum computation, weight registers 412 (Weight Reg) are populated by weight fields from the NMP-Inst (e.g., the 32-bit weight field (weight FP32) of NMP-Inst format 500 of FIG. 5). Similarly, quantized operators (e.g., quantizing from a higher-bit format to an 8-bit format) are also supported via registers (Scalar Reg and Bias Reg) that store quantization parameters, which can be fetched from memory and loaded into these registers. During execution of non-weighted and non-quantized embedding operations, Weight Reg, Scalar Reg, and Bias Reg are set to 1, 1, and 0 respectively.

In various embodiments, a partial sum tag decoded from the NMP-Inst is used to identify the embedding vectors belonging to the same pooling operations (e.g., the PsumTag field of NMP-Inst format 500 of FIG. 5). Using this type of tag, multiple pooling operations in one batch for one embedding table can be served in parallel. Stated alternatively, this tag identifies which partial sums contribute to a final sum (which vectors should be added together). Partial sum vectors may be stored in Psum Vector Reg in the example illustrated. Other registers in the example illustrated include a register to store the vector size (vsize) and controller counter (Counter++). In the example shown, Psum Vector Reg outputs a final partial sum (Rank.Psum) to be returned to a DIMM-NMP unit (e.g., DIMM-NMP system 300 of FIG. 3).

FIG. 5 is a diagram illustrating an embodiment of an NMP-Inst format. In the example shown, NMP-Inst format 500 includes 79 bits. The first 4 bits in NMP-Inst format 500 are an op code field that specifies the type of embedding operation to be performed (Op Code). Using 4 bits, 16 different embedding operations can be specified. Example embedding operations include SLS (lookup with a sum reduction) and its variants (e.g., weighted sum, weighted and quantized sum, etc.). Variants of embedding operations include embedding operations for different data formats (e.g., 8-bit, 32-bit, etc.). In various embodiments, rank-NMP system 400 determines which computation to perform on a retrieved embedding vector based on the op code (e.g., determines what values to load into Weight Reg, Scalar Reg, and Bias Reg of rank-NMP system 400). For a description of the other fields in NMP-Inst format 500, see the description above associated with FIG. 4. The sparse, irregular nature of embedding lookups exerts a high demand on C/A bandwidth. This is addressed, at least in part, by sending a compressed instruction format (e.g., see description associated with FIG. 4 regarding the DDR cmd field) over a standard memory interface, conforming to standard DRAM physical pin-outs and timing constraints.

Figure 6:
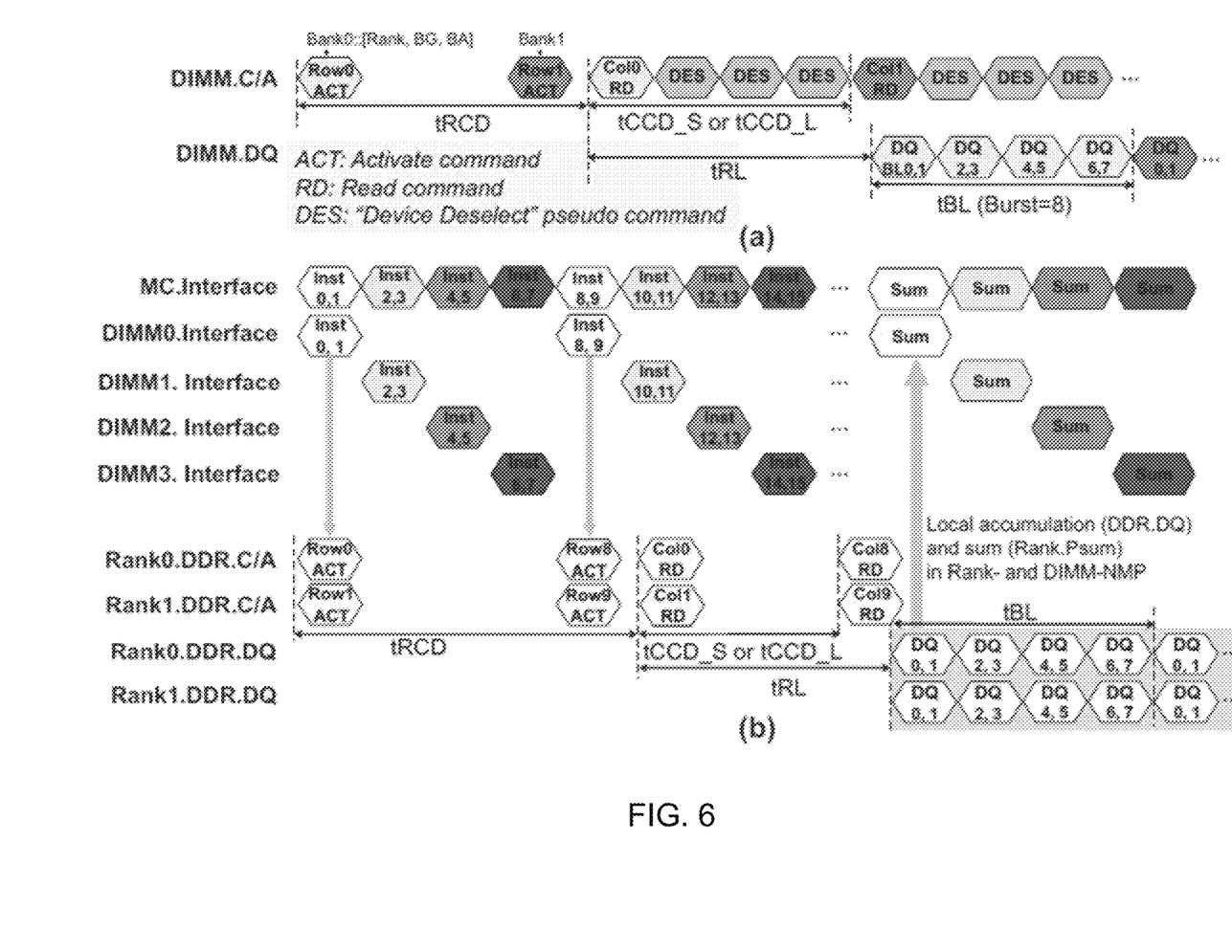
FIG. 6 shows timing diagrams that illustrate command/address bandwidth usage.

FIG. 6 shows timing diagrams that illustrate command/address bandwidth usage. In the example shown, the embedding vector size is 64 B. An example conventional timing diagram is shown in FIG. 6(*a*). FIG. 6(*a*) shows a sequence of bank-interleaved DRAM reads that can achieve one consecutive data burst. In this burst mode, the ACT command first sets the row address. Then the RD command is sent accompanied by the column address. After tRL DRAM cycles, the first set of two 64-bit data (DQ0 and DQ1) appear on the data bus. The burst mode lasts for 4 DRAM cycles (burst length=8) and transmits a total of 64 B on the DQ pins at both rising and falling edges of the clock signal. Because modern memory systems employ bank interleaving, in the next burst cycle (4 DRAM cycles), data from a different bank can be accessed in a sequential manner. In this bank interleaving case, every 64 B data transfer takes 4 DRAM cycles and requires 3 DDR commands (ACT/RD/PRE) to be sent over the DIMM C/A interface, and this consumes 75% of the C/A bandwidth. Activating more than one bank concurrently would require issuing more DDR commands, thus exhausting the available C/A bandwidth of a conventional memory interface.

To overcome C/A bandwidth limitations, a customized NMP-Inst with a compressed format of DDR commands (e.g., with the format of NMP-Inst format 500 of FIG. 5) to be transmitted from memory controller (e.g., memory controller 104 of FIG. 1) to memory module processing unit (e.g., memory module processing unit 200 of FIG. 2) can be utilized. FIG. 9(*b*) illustrates a timing diagram interleaving NMP-Insts to a 4 DIMMs×2 Ranks per DIMM memory configuration. Eight NMP-Insts can be transferred between memory controller and DIMM interfaces in 4 DRAM data burst cycles on double data rate. In a low spatial locality use case (64 B embedding vector and one NMP-Inst per vector) with bank interleaving, 8 parallel ranks can potentially be activated to perform 8×64 B lookups concurrently in 4 DRAM data burst cycles. Thus, C/A bandwidth limitations can be addressed using DDR command compression that enables up to 8× bandwidth expansion for small-sized embedding vectors (e.g., 64 B) with low spatial locality. Higher expansion ratios can be achieved with larger vector sizes.

Figure 7:
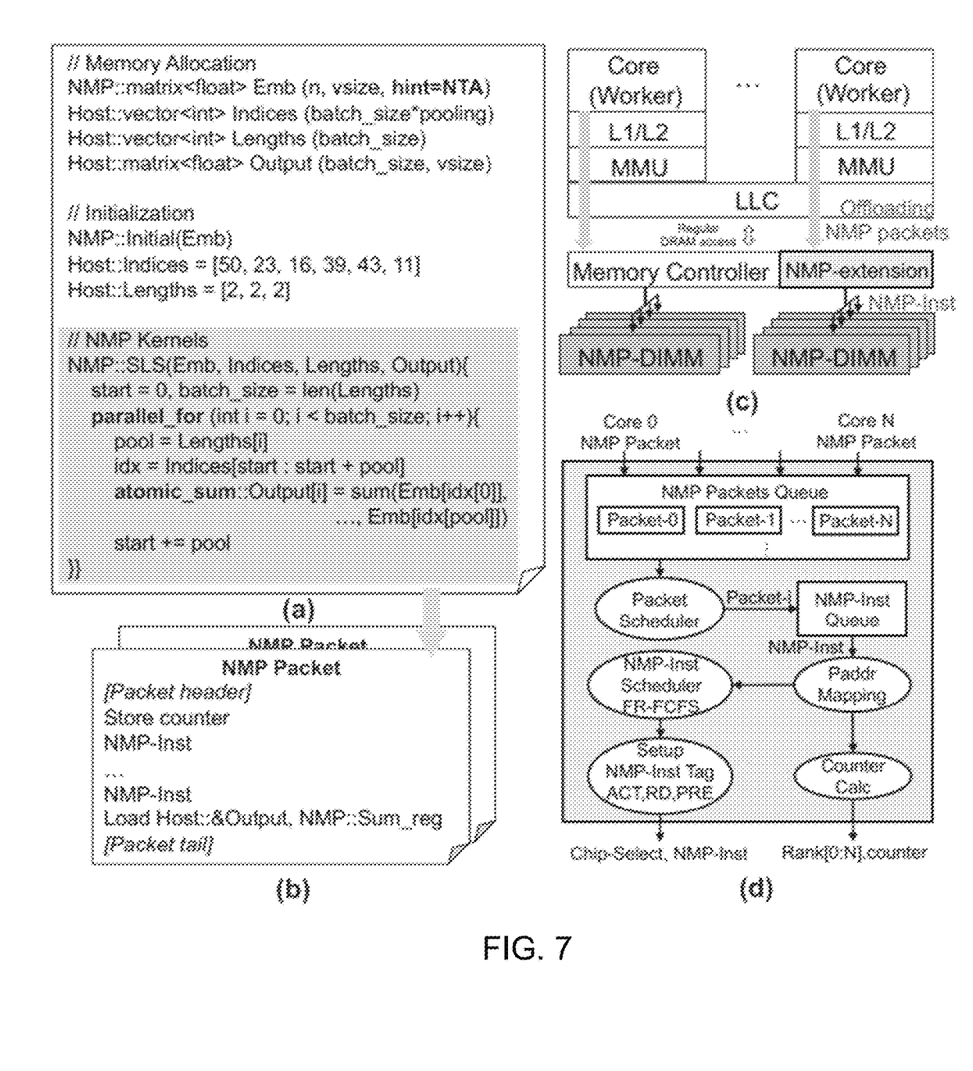
FIG. 7 shows execution flow of a programming model associated with a memory module processing unit.

FIG. 7 shows execution flow of a programming model associated with a memory module processing unit. In various embodiments, a heterogeneous computing programming model (e.g., OpenCL) is utilized in which an application that is run is divided into host calls running on a CPU and NMP kernels being offloaded to a memory module processing unit (e.g., memory module processing unit 200 of FIG. 2). In various embodiments, NMP kernels are compiled into packets of NMP-Insts and transmitted to each memory channel over a DIMM interface to memory module processing units. Results of NMP kernels are then transmitted back to the host CPU. As shown in NMP-Inst format 500 of FIG. 5, a 79-bit NMP-Inst that includes distinctive fields that are associated with different parameters in an embedding operation and can fit within a standard 84-pin C/A and DQ interface can be utilized.

An example SLS function call is shown in FIG. 7(a). In the example shown, memory is allocated for SLS input and output data, and is marked up as either Host (cacheable) or NMP (non-cacheable) regions to simplify memory coherence between the host and the memory module processing unit. In some embodiments, the marking up (of code corresponding to the SLS function call or another function call) occurs during compile time. Variables containing host visible data, such as the two arrays Indices and Lengths, are initialized and loaded by the host and are cacheable in the host CPU's cache hierarchy. The embedding table (Emb) in memory is initialized by the host as a host noncacheable NMP region using a non-temporal hint (NTA). Next, as shown in the example of FIG. 7(b), the code segment marked as an NMP kernel is compiled to packets of NMP-Insts. A single SLS NMP kernel containing one batch of embedding poolings can be split into multiple NMP packets, with each packet having one or more pooling operations. The NMP-Insts belonging to different embedding poolings in one NMP packet are tagged by PsumTag, and the maximum number of poolings in one packet is determined by the number of bits of the PsumTag. For example, a 4-bit PsumTag (corresponding to a maximum of 16 poolings) is shown in NMP-Inst format 500 of FIG. 5.

At runtime, in various embodiments, the NMP kernel is launched by the host with special hardware/driver support to handle NMP packet offloading, access to a memory management unit (MMU) to request memory for NMP operations, and a virtual memory system for logical-to-physical addresses translation. As shown in the example of FIG. 7(c), offloaded NMP packets bypass L1/L2/LLC caches and arrive at the host-side memory controller with an NMP extension. In various embodiments, to avoid scheduling the NMP packets out-of-order based on a First Ready-First Come, First Served (FR-FCFS) policy, the NMP extension of the memory controller includes extra scheduling and arbitration logic. As shown in the example of FIG. 7(d), the memory controller with the NMP extension receives concurrent NMP packets from parallel execution of multiple host cores, which are stored in a queue. Once scheduled, each NMP packet can be decoded into queued NMP-Insts. Physical-to-DRAM address mapping can then be performed and a FR-FCFS scheduler can reorder the NMP-Insts within a packet instead of between packets. As described above, in various embodiments, instead of sending direct DDR commands, ACT/RD/PRE actions are compressed into a 3-bit DDR cmd field in the NMP-Inst (e.g., as shown in NMP-Inst format 500 of FIG. 5). The host-side memory controller can calculate the correct accumulation counter value to configure memory mapped control registers in the memory module processing unit. In various embodiments, after completion of all the counter-controlled local computation inside the memory module processing unit for one NMP packet, the final summed result is transmitted over the DIMM interface and returned to an output cacheable memory region visible to the CPU.

Figure 8:
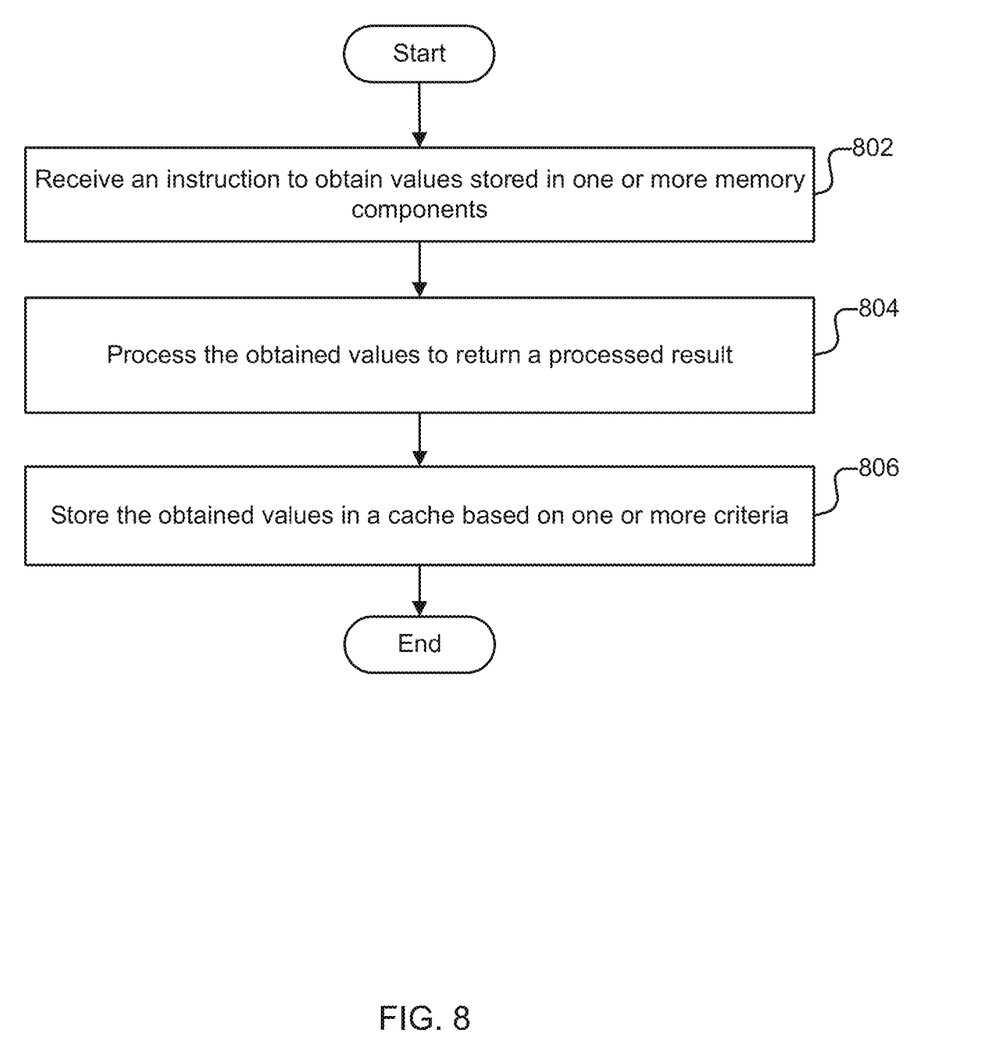
FIG. 8 is a flow chart illustrating an embodiment of a process for processing an instruction to obtain values stored in one or more memory components.

FIG. 8 is a flow chart illustrating an embodiment of a process for processing an instruction to obtain values stored in one or more memory components. In some embodiments, the process of FIG. 8 is performed by memory module processing unit 200 of FIG. 2.

At 802, an instruction to obtain values stored in one or more memory components is received. In some embodiments, the instruction is received by memory module processing unit 200 of FIG. 2. In some embodiments, the instruction has the format of NMP-Inst format 500 of FIG. 5. In some embodiments, the memory components are DRAM devices. In various embodiments, communication with the memory components is conducted through an interface. For example, a standard DRAM device interface conforming to standard DRAM physical pin-outs and timing constraints may be utilized, e.g., by using DQ and C/A pins connecting rank-NMP units and DRAM devices. The interface may be used to send DDR commands (e.g., ACT, RD, PRE, etc.). In some embodiments, the values are part of an embedding vector. In various embodiments, the instruction is an embedding operation (e.g., SLS or a variant of SLS).

At 804, the obtained values are processed to return a processed result. For example, the processing may include summing up the obtained values. This is the case when the instruction is SLS or a variant of SLS. Embedding operations typically include a lookup to obtain the values and a pooling operation to process the obtained values. Other examples of processing of the obtained values include applying weights to the obtained values and quantizing the obtained values. These processing operations may be performed in addition to summing the obtained values. For example, obtained values may have weights applied to them, summed, and then quantized (e.g., from 32-bit values to 8-bit values). In some embodiments, the processing is performed at least in part by Rank-NMP 204 or 206 of FIG. 2 or rank-NMP system 400 of FIG. 4 (e.g., summing of data in input embedding vector registers 410 of FIG. 4 with or without application of weights stored in weight registers 412 of FIG. 4). In some embodiments, further processing is performed by DIMM-NMP 202 of memory module processing unit 200 of FIG. 2 or DIMM-NMP system 300 of FIG. 3 (e.g., summing various partial sums from multiple rank-NMP units).

At 806, the obtained values are stored in a cache based on one or more criteria. In some embodiments, the cache is located in Rank-NMP 204 or 206 of FIG. 2 or rank-NMP system 400 of FIG. 4. The obtained values may be stored in the cache based on an indication that the obtained values exhibit temporal reuse locality (e.g., the obtained values are accessed a specified number of times over a specified time period). In some embodiments, a locality bit in the instruction (e.g., the locality bit in NMP-Inst format 500 of FIG. 5) is used to indicate that the obtained values should be stored in the cache. In some embodiments, steps 804 and 806 are performed, at least in part, at the same time. It is possible for either step 804 or 806 to commence before the other.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
   a memory module processing unit configured to:
   receive an instruction to obtain values stored in one or more memory components and process the obtained values to return a processed result; and
   store the obtained values in a cache based on one or more criteria;
   wherein:
   the memory module processing unit is configured to be included on a computer memory module configured to be installed in a computer system; and the memory module processing unit includes a primary processing component and a plurality of secondary processing components communicatively connected to the primary processing component, wherein:

the primary processing component is configured to receive the instruction and transmit the instruction to the plurality of secondary processing components;

the primary processing component includes a hardware component configured to queue multiple instructions and distribute the queued multiple instructions to the plurality of secondary processing components; and at least one secondary processing component of the plurality of secondary processing components includes:

an instruction buffer configured to receive the instruction from the primary processing component; and instruction decoding circuitry configured to determine a value of a field within the instruction, wherein the value of the field indicates whether the values stored in the one or more memory components are also located in the cache; and an interface configured to communicate with the one or more memory components included on the computer memory module.

2. The device of claim 1, wherein the instruction is an embedding operation.

3. The device of claim 2, wherein the embedding operation includes a summation computation.

4. The device of claim 1, wherein at least one of the one or more memory components is a dynamic random-access memory device.

5. The device of claim 1, wherein the memory module processing unit is configured to process the obtained values including by being configured to sum the obtained values.

6. The device of claim 1, wherein the memory module processing unit is configured to process the obtained values including by being configured to apply weights to the obtained values.

7. The device of claim 1, wherein the memory module processing unit is configured to process the obtained values including by being configured to quantize the obtained values.

8. The device of claim 1, wherein the one or more criteria include a determination that the obtained values are accessed a specified number of times over a specified time period.

9. The device of claim 1, wherein the computer memory module is a dual-inline memory module.

10. The device of claim 1, wherein the computer system includes a memory controller that interfaces with the memory module processing unit.

11. The device of claim 1, wherein the interface is a dynamic random-access memory device interface that supports a protocol for communicating double data rate compatible command, address, and data signals.

12. The device of claim 1, further comprising the one or more memory components.

13. The device of claim 1, further comprising the cache.

14. The device of claim 13, wherein the cache is communicatively connected to an instruction decoder.

15. The device of claim 1, wherein the instruction is utilized in a personalized recommendation system operation.

16. The device of claim 1, wherein the one or more memory components are configured as a plurality of memory ranks that supports parallel access.

17. The device of claim 1, wherein the interface is configured to communicate with the one or more memory components including by being configured to transmit double data rate commands in a compressed format.

18. The device of claim 1, wherein the instruction is in a format that includes one or more of the following fields: an op code field, a double data rate command field, a data address field, and a data size field.

19. A method, comprising:

using a memory module processing unit that is configured to be included on a computer memory module configured to be installed in a computer system to receive an instruction to obtain values stored in one or more memory components and process the obtained values to return a processed result;

using the memory module processing unit to store the obtained values in a cache based on one or more criteria; and using an interface to communicate with the one or more memory components included on the computer memory module;

wherein the memory module processing unit includes a primary processing component and a plurality of secondary processing components communicatively connected to the primary processing component, wherein:

the primary processing component is configured to receive the instruction and transmit the instruction to the plurality of secondary processing components;

the primary processing component includes a hardware component configured to queue multiple instructions and distribute the queued multiple instructions to the plurality of secondary processing components; and at least one secondary processing component of the plurality of secondary processing components includes:

an instruction buffer configured to receive the instruction from the primary processing component; and instruction decoding circuitry configured to determine a value of a field within the instruction, wherein the value of the field indicates whether the values stored in the one or more memory components are also located in the cache.

20. A device, comprising:

a first memory module processing unit configured to:

receive a first instruction to obtain values stored in one or more memory components and process the obtained values to return a processed result; and store the obtained values in a cache based on one or more criteria;

wherein:

the first memory module processing unit is configured to be included on a computer memory module configured to be installed in a computer system; and the first memory module processing unit includes a primary processing component and a plurality of secondary processing components communicatively connected to the primary processing component, wherein:

the primary processing component is configured to receive the first instruction and transmit the first instruction to the plurality of secondary processing components;

the primary processing component includes a hardware component configured to queue multiple instructions and distribute the queued multiple instructions to the plurality of secondary processing components; and at least one secondary processing component of the plurality of secondary processing components includes:

an instruction buffer configured to receive the instruction from the primary processing component; and instruction decoding circuitry configured to determine a value of a field within the instruction, wherein the value of the field indicates whether the values stored in the one or more memory components are also located in the cache;

an interface configured to communicate with the one or more memory components included on the computer memory module; and a second memory module processing unit configured to receive a second instruction, wherein the second instruction has a format that is different from that of the first instruction.

\* \* \* \* \*